United States Patent
Yamauchi et al.

(10) Patent No.: US 7,508,144 B2
(45) Date of Patent: Mar. 24, 2009

(54) LIGHT SOURCE DEVICE, LIGHTING AND DRIVING METHOD THEREOF AND PROJECTOR

(75) Inventors: Kentaro Yamauchi, Suwa (JP); Kazuhiro Tanaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/882,026

(22) Filed: Jul. 30, 2007

(65) Prior Publication Data
US 2008/0048583 A1  Feb. 28, 2008

(30) Foreign Application Priority Data
Jul. 31, 2006 (JP) ............... 2006-208127
Jul. 11, 2007 (JP) ............... 2007-181884

(51) Int. Cl.
*G05F 1/00* (2006.01)

(52) U.S. Cl. ............ 315/291; 315/224; 315/307; 315/209 R; 353/85

(58) Field of Classification Search .......... 315/291, 315/224, 307, 289, 209 R, 246; 353/30, 353/49, 85; 348/744
See application file for complete search history.

(56) References Cited

U.S. PATENT DOCUMENTS

| 5,365,151 A * | 11/1994 | Spiegel et al. ........... 315/209 R |
| 6,495,971 B1 * | 12/2002 | Greenwood et al. ......... 315/291 |
| 6,927,539 B2 * | 8/2005 | Arimoto et al. ............ 315/59 |
| 6,943,503 B2 | 9/2005 | Ozasa et al. |
| 7,067,990 B2 | 6/2006 | Nagai et al. |
| 7,275,835 B2 * | 10/2007 | Kataoka ................. 353/85 |
| 2006/0049775 A1 | 3/2006 | Kataoka |

FOREIGN PATENT DOCUMENTS

| JP | A 2000-323287 | 11/2000 |
| JP | A-2003-338394 | 11/2003 |
| JP | A 2005-227748 | 8/2005 |
| JP | A 2006-072196 | 3/2006 |
| JP | A 2006-120654 | 5/2006 |

* cited by examiner

*Primary Examiner*—Haissa Philogene
(74) *Attorney, Agent, or Firm*—Oliff & Berridge, PLC

(57) ABSTRACT

A light source device, including: a high pressure discharge lamp in which an electric discharge is generated between a pair of electrodes; a lighting device that supplies drive current having a predetermined frequency to the high pressure discharge lamp to light and drive the high pressure discharge lamp; and a control device that controllably drives the lighting device, the control device including: a power-change controller that controls drive power supplied from the lighting device to the high pressure discharge lamp to be changeable at least between a first power and a second power lower than the first power; and a frequency-change controller that controls a frequency of the drive current supplied from the lighting device to the high pressure discharge lamp to be changeable, in a second power drive mode in which the second power is supplied to the high pressure discharge lamp by the power-change controller, the frequency-change controller changing the frequency of the drive power to a frequency higher than a frequency in a first drive mode in which the first power is supplied to the high pressure discharge lamp by the power-change controller.

11 Claims, 11 Drawing Sheets

LIGHT SOURCE DEVICE, LIGHTING AND DRIVING METHOD THEREOF AND PROJECTOR

The entire disclosure of Japanese Patent Application No. 2006-208127 filed Jul. 31, 2006 and Japanese Patent Application No. 2007-181884 filed Jul. 11, 2007 is expressly incorporated by reference herein.

BACKGROUND

1. Technical Field

The present invention relates to a light source device, a lighting and driving method of the light source device and a projector.

2. Related Art

Light source devices including: a high pressure discharge lamp in which a discharge is generated between a pair of electrodes; a lighting device that supplies drive current (alternating current) to the high pressure discharge lamp in order to light and drive the high pressure discharge lamp; and a control device that controllably drives the lighting device, have been known.

In the light source devices, when the high pressure discharge lamp is lighted and driven with drive current of a relatively low frequency, a projection (a discharge trigger) is formed on an tip end of the electrodes of the high pressure discharge lamp (hereinafter referred to as a first projection). In such a lighting and driving, wear on the tip end of the electrodes of the high pressure discharge lamp can be avoided, thereby increasing the longevity of the high pressure discharge lamp.

However, in such a lighting and driving of the high pressure discharge lamp, since the temperature of the electrodes of the high pressure discharge lamp is relatively low, even when the first projection is formed, arc position is moved, so that an arc cannot be stabilized and a flicker may occur. Similarly, when the high pressure discharge lamp is lighted and driven with relatively low drive power, the electrode temperature of the high pressure discharge lamp will be also relatively low and a flicker may occur.

A below-described technology has been suggested for avoiding such a flicker (see, for example, JP-A-2005-227748).

In the technology described in the document, when a discharge voltage of the high pressure discharge lamp varies, both of the magnitude and the frequency of the drive power supplied to the high pressure discharge lamp are increased. By increasing the magnitude and the frequency of the drive power of the high pressure discharge lamp, a temperature of gas in the high pressure discharge lamp is raised, thereby avoiding fluctuation in the discharge position in the high pressure discharge lamp (flicker).

The flicker is triggered not only by a reduction in the temperature of the electrodes but also by an unnecessarily formed projection other than the first projection on the electrode (hereinafter referred to as a second projection) can be exemplified.

For example, when the frequency of the drive current supplied to the high pressure discharge lamp is relatively high, temperature distribution on a surface of the electrodes becomes uniform. When the temperature distribution on the surface of the electrodes is uniform, the second projection other than the first projection is easily formed on the electrodes. Thus, when the second projection is formed on the electrodes, an arc origin is moved to the first or second projection, thereby causing a flicker.

In the technology described in the document, a flicker caused by the reduction in electrode temperature can be avoided by increasing the magnitude and the frequency of the drive power to the high pressure discharge lamp. However in the technology described in the document, since the magnitude and the frequency of the drive power supplied to the high pressure discharge lamp are increased, the second projection is easily formed on the electrodes, so that it is not possible to avoid a flicker caused by the second projection other than the first projection on the electrodes.

In addition, in the technology described in the document, since the magnitude and the frequency of the drive power supplied to the high pressure discharge lamp are increased, namely since the drive current of a relatively high frequency is supplied to the high pressure discharge lamp, the tip end of the electrodes wears, so that it is not possible to increase the longevity of the high pressure discharge lamp.

Therefore, there have been demands for a technology that can increase the longevity of the high pressure discharge lamp and avoid a flicker.

SUMMARY

An advantage of some aspects of the invention is to provide a light source device, a lighting and driving method of the light source device and a projector which can increase the longevity of a high pressure discharge lamp and avoid a flicker.

A light source device according to an aspect of the invention, includes: a high pressure discharge lamp in which an electric discharge is generated between a pair of electrodes; a lighting device that supplies drive current having a predetermined frequency to the high pressure discharge lamp to light and drive the high pressure discharge lamp; and a control device that controllably drives the lighting device. The control device includes: a power-change controller that controls drive power supplied from the lighting device to the high pressure discharge lamp to be changeable at least between a first power and a second power lower than the first power; and a frequency-change controller that controls a frequency of the drive current supplied from the lighting device to the high pressure discharge lamp to be changeable. In a second power drive mode in which the second drive power is supplied to the high pressure discharge lamp by the power-change controller, the frequency-change controller changes the frequency of the drive power to a frequency higher than a frequency in a first drive mode in which the first power is supplied to the high pressure discharge lamp by the power-change controller.

According to the aspect of the invention, the control device includes the power-change controller and the frequency-change controller and the high pressured discharge lamp is supplied with the drive current of the first power higher than the drive power in the second power drive mode and of the frequency lower than the frequency in the second power drive mode in the first power drive mode. Accordingly, in the first power drive mode, supplying the relatively high first power to the high pressure discharge lamp can suppress a reduction in the temperature of the electrodes of the high pressure discharge lamp and supplying the drive current having the relatively low frequency to the high pressure discharge lamp can avoid a formation of a second projection on the electrodes. Hence, in the first drive mode, it is possible to appropriately avoid a flicker caused by the temperature reduction of the electrodes and a flicker caused by the second projection formed on the electrodes. Further, in the first power drive mode, since the high pressure discharge lamp is supplied with the drive current of the relatively low frequency, wear of a tip end of the electrodes of the high pressure discharge lamp can be avoided, thereby increasing the longevity of the high pressure discharge lamp.

Thus, a flicker can be appropriately avoided in the first power drive mode. However, in the second power drive mode, when the high pressure discharge lamp is supplied with the drive power lower than the rated power while maintaining the same frequency as the frequency in the first power drive mode, the frequency of the drive current supplied to the high pressure discharge lamp becomes relatively low, so that it is not possible to suppress the reduction in the temperature of the electrodes.

In the aspect of the invention, in the second power drive mode, the control device controls such that the high pressure discharge lamp is supplied with the drive current of the second power lower than the first power in the first power drive mode and of the frequency higher than the frequency in the first power drive mode. Accordingly, in the second power drive mode, since the high pressure discharge lamp is supplied with the drive current of the relatively high frequency, the reduction in the temperature of the electrodes of the high pressure discharge lamp can be suppressed.

Hence, a flicker can be appropriately avoided in both of the first power drive mode and the second power drive mode.

In the light source device according to the aspect of the invention, the frequency in the first power drive mode may be preset at a frequency in which a flicker judging value based on a change rate of illuminance measured at a predetermined interval is smaller than a predetermined threshold value when the light source device is driven in the first power drive mode.

In the light source device according to the aspect of the invention, the frequency in the second power drive mode may be preset at a frequency in which the flicker judging value based on the change rate of illuminance measured at a predetermined interval is smaller than a predetermined threshold value when the light source device is driven in the second power drive mode.

According to the aspects of the invention, the frequency in the first power drive mode (hereinafter referred to as a first drive frequency) or the frequency in the second power drive mode (hereinafter referred to as a second power drive frequency) are preset as described below.

Specifically, the drive current of the first power or the drive power lower than the first power and of the predetermined frequency is supplied to the high pressure discharge lamp of the light source device of which frequency is to be set, thereby lighting the high pressure discharge lamp (the first drive or the second power drive).

Next, the illuminance of the light beam irradiated from the light source device is measured for each predetermined time period at the predetermined interval by an illuminance meter.

Subsequently, the change rate of the measured illuminance is calculated. For example, results of two successive measurements in the illuminance measurement conducted at the predetermined interval are used to calculate the change rate of illuminance of the latter measurement relative to the former measurement.

Subsequently, based on the calculated change rate, a flicker judging value for judging the existence of a flicker is calculated. For example, the maximum change rate and the minimum change rate out of the change rates are recognized and the flicker value is obtained by subtracting the minimum change rate from the maximum change.

Then, the flicker judging value and the predetermined threshold value are compared to judge whether variation in illuminance is large.

The above-described steps are conducted for each of the plurality of light source devices with the supplied drive currents set to have different frequencies. The comparison between the flicker judging value and the predetermined threshold value is conducted for each of the plurality of light source devices, thereby recognizing at least one light source device that has been judged to have the flicker judging value smaller than the predetermined threshold value (i.e. the small variation in illuminance) and contain no flicker. The most appropriate frequency is selected from the drive conditions (the frequencies) of the recognized light source devices to be set as the rated drive frequency or the low power drive frequency.

Thus, since the first drive frequency or the second power drive frequency which causes no flicker for a predetermined time period is preset, it is possible to reliably avoid a flicker in both of the first drive mode and the second power drive mode.

In the light source device according to the aspect of the invention, the frequency in the first power drive mode may be preset at a frequency in which a lamp voltage of the high pressure discharge lamp has a value equal to or larger than a predetermined threshold value for a predetermined time period when the light source device is driven in the first power drive mode.

In the light source device according to the aspect of the invention, the frequency in the second power drive mode may be preset at a frequency in which the lamp voltage of the high pressure discharge lamp has a value equal to or larger than a predetermined threshold value for a predetermined time period when the light source device is driven in the second power drive mode.

As a characteristic of the high pressure discharge lamp, it is known that the lamp voltage is lowered in an initial period of the lighting (for example, fifty hours from the start of the lighting). When the lamp voltage is lowered, a large magnitude of the drive current is flown in the high pressure discharge lamp in order to maintain the constant power supplied to the high pressure discharge lamp. In such a case, since the lighting device becomes excessively hot due to the large magnitude of the drive current flowing in the high pressure discharge lamp, the control device generally controls the lighting device such that the current value of the drive current will not be equal to or larger than a predetermined limit value. In other words, the control device conducts a control for reducing the drive power supplied to the high pressure discharge lamp such that the current value of the drive current will not be equal to or larger than the predetermined limit value. Such a control for reducing the drive power in accordance with the reduction in the lamp voltage is conducted may result in a reduction in brightness of the light beam irradiated from the light source device or a blackening in which a material of the electrodes evaporated due to the temperature anomaly of the electrodes is adhered on an inner wall of the high pressure discharge lamp. In addition, supplying the drive current having a current value close to the limit value to the high pressure discharge lamp will increase the damage on the electrodes, thereby obstructing the increase in the longevity of the high pressure discharge lamp. Hence, in driving the high pressure discharge lamp, it is necessary to maintain the value of the lamp voltage to be equal to or larger than the predetermined threshold value such that the drive current will not be excessively large.

In the aspect of the invention, the first power drive frequency or the second power drive frequency is preset as exemplified below.

Specifically, the drive current of the first power or the second power and of the predetermined frequency is supplied to the high pressure discharge lamp of the light source device of which frequency is to be set, thereby lighting the high pressure discharge lamp (the first power drive or the low power drive).

Next, the lamp voltage applied to the high pressure discharge lamp is continuously detected for the predetermined time period.

Then, the detected lamp voltage and the predetermined threshold value are compared to judge whether the value of the lamp voltage is equal to or larger than the predetermined threshold value.

The above-described steps are conducted for a plurality of light source devices while varying the frequencies of the drive currents supplied to the light source devices. The comparison between the lamp voltage and the predetermined threshold value is conducted for each of the plurality of light source devices, thereby recognizing at least one light source device that has been judged to have the lamp voltage value equal to or larger than the predetermined threshold value. The most appropriated frequency is selected from the drive conditions (the frequencies) of the recognized light source devices to be set as the first power drive frequency or the second power drive frequency.

Thus, since the first power drive frequency or the second power drive frequency which realizes the value of the lamp voltage to be equal to or larger than the predetermined threshold value are preset for a predetermined time period, in the first power drive mode or the second power drive mode, a reduction in brightness of the light beam irradiated from the light source device or a blackening will not be provoked and the drive current will not be excessively large (i.e. the drive current will be suppressed to be equal to or lower than the limit value), so that damage on the electrodes can be reduced, thereby increasing the longevity of the light source lamp.

A driving method for a high pressure discharge lamp, the power supplied to the high pressure discharge lamp being changeable between two or more levels, the method comprising steps of supplying first power with first frequency to the pressure discharge lamp, and supplying second power with second frequency to the pressure discharge lamp, wherein the second power is lower than the first power and the second frequency is higher than the first frequency.

According to the aspect of the invention, the driving method of the light source device includes supplying first current with first frequency to the pressure discharge lamp, and supplying second current with second frequency to the pressure discharge lamp, wherein the second current is lower than the first current and the second frequency is higher than the first frequency. In the frequency of the drive current is changed to a frequency higher than the frequency in the first power drive mode, thereby providing the same effects and advantages as those of the light source device.

A projector according to an aspect of the invention includes: a light source device; an optical modulator that modulates a light beam irradiated from the light source device in accordance with image information to form an optical image; and a projection optical device that projects the optical image formed by the optical modulator in an enlarged manner, the light source device being the above-described light source device.

According to the aspect of the invention, the projector includes the above-described light source device, thereby also providing the same effects and advantages as the above-described light source device.

In addition, since the projector includes the light source device that can increase the longevity of the light source lamp, the longevity of the projector itself can be also increased.

Further, since the projector includes the light source device that can avoid flicker, an appropriate projection image including no flicker can be formed.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the drawings.

Outline of Structure of Projector

Figure 1:
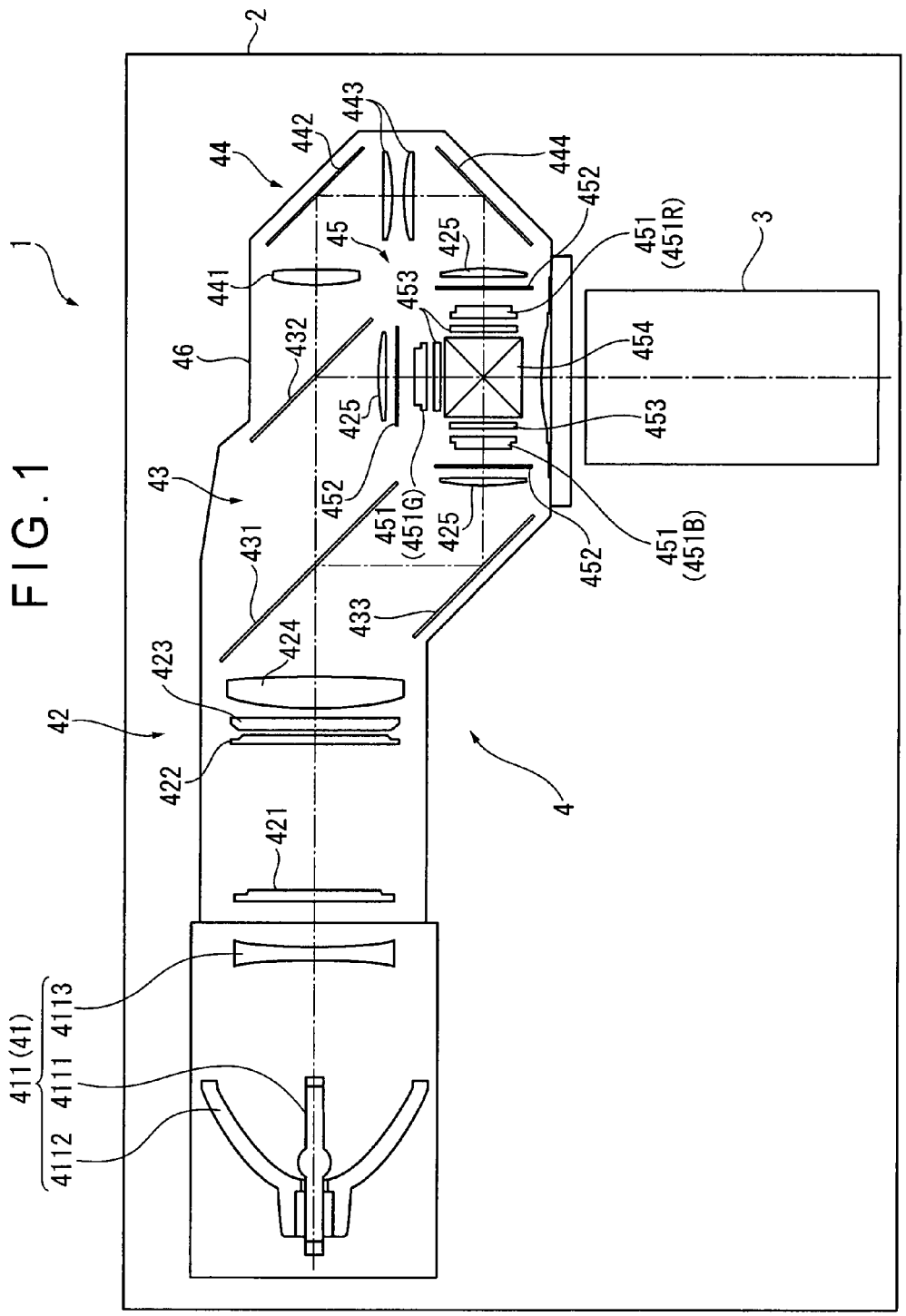
FIG. 1 schematically shows an outline of a structure of a projector of a first exemplary embodiment.

FIG. 1 schematically shows an outline of a structure of a projector 1.

The projector 1 modulates a light beam irradiated from a light source in accordance with image information to form a color image (an optical image) and projects the color image onto a screen (not shown) in an enlarged manner. As shown in FIG. 1, the projector 1 includes an exterior casing 2 in a substantially rectangular parallelepiped shape, a projection lens 3 as a projection optical device, an optical unit 4 and the like.

Although not specifically shown in FIG. 1, in the exterior casing 2, a cooling unit that cools the inside of the projector 1, a power source unit that supplies power to components in the projector 1, a control board that controls the components in the projector 1 and the like are disposed in a space not occupied by the projection lens 3 and the optical unit 4.

The projection lens 3 is a lens set including a plurality of lenses accommodated in a cylindrical lens barrel. The projection lens 3 projects a color image formed by the optical unit 4 on a screen in an enlarged manner.

Detailed Description of Optical Unit

As shown in FIG. 1, the optical unit 4 extends along a rear surface and a lateral surface of the exterior casing 2, forming a substantially L-shape in plan view. Under the control of the control board, the optical unit 4 optically processes a light beam irradiated from the light source and forms a color image in accordance with image information. As shown in FIG. 1, the optical unit 4 includes a light source device 41, an integrator illuminating optical device 42, a color separating optical device 43, a relay optical device 44, an optical device 45 and an optical component casing 46.

The light source device 41 irradiates a light beam to the integrator illuminating optical device 42. Although a detailed description will be given later, the light source device 41 includes a light source device main body 411, a lighting device 5 (see FIG. 2) that supplies drive current of a predetermined frequency to a light source lamp 4111 (a high pressure discharge lamp) constituting the light source device main body 411, thereby lighting the light source lamp 4111 and a control device 6 (see FIG. 2) that controllably drives the lighting device 5.

The light source device main body 411 includes the light source lamp 4111 in which an electric discharge is generated between a pair of electrodes 4111A (see FIG. 2), a main reflecting mirror 4112 and a collimating lens 4113.

A light beam radiated from the light source lamp 4111 is aligned by the main reflecting mirror 4112 into an irradiation direction and irradiated as converging light toward a front side of the light source device main body 411. The converging light is then collimated by the collimating lens 4113 and irradiated to the integrator illuminating optical device 42.

As the light source lamp 4111, a halogen lamp, a metal halide lamp or a high-pressure mercury lamp is often used. In FIG. 1, the main reflecting mirror 4112 is an ellipsoidal reflector. However, the main reflecting mirror 4112 may be a parabola reflector that substantially collimates and reflects the light beam irradiated from the light source lamp 4111. In such a case, the collimating lens 4113 is omitted.

The integrator illuminating optical device 42 is an optical system that substantially uniformly illuminates the light beam irradiated from the light source device main body 411 onto image formation areas of later-described liquid crystal panels of the optical device 45. As shown in FIG. 1, the integrator illuminating optical device 42 includes a first lens array 421, a second lens array 422, a polarization converter 423 and a superposing lens 424.

The first lens array 421 has first small lenses having a substantially rectangular contour when seen in an axial direction of a light beam incident thereon. The first small lenses are arranged in a matrix form in a plane substantially orthogonal to the axial direction of the incident light beam. The first small lenses each divide a light beam irradiated from the light source device main body 411 into a plurality of partial light beams.

The second lens array 422 has the substantially same structure as that of the first lens array 421, in which second small lenses are arranged in a matrix form. In corporation with the superposing lens 424, the second lens array 422 focuses images of the first small lenses of the first lens array 421 onto the later-described liquid crystal panels of the optical device 45.

The polarization converter 423 is disposed between the second lens array 422 and the superposing lens 424 and converts light from the second lens array 422 into substantially uniform polarized light.

Specifically, the superposing lens 424 substantially superposes the partial light beams converted into the substantially uniform polarized light by the polarization converter 423 on the below-described liquid crystal panels of the optical device 45. Note that since only one-type of polarized light can be used by the projector using the liquid crystal panels that modulate polarized light, approximately half of the light from the light source device 41 that emits random polarized light cannot be used. Accordingly, by using the polarization converter 423, irradiation light from the light source device 41 is converted into substantially uniform polarized light, thereby enhancing light utilization efficiency of the optical device 45.

As shown in FIG. 1, the color separating optical device 43 has two dichroic mirrors 431, 432 and a reflecting mirror 433 and separates a plurality of partial light beams irradiated from the integrator illuminating optical device 42 by the dichroic mirrors 431, 432 into red color light, green color light and blue color light.

As shown in FIG. 1, the relay optical device 44 has an incident-side lens 441, a relay lens 443 and reflecting mirrors 442, 444 and guides the red color light separated by the color separating optical device 43 to a later-described red liquid crystal panel of the optical device 45.

At this point, the dichroic mirror 431 of the color separating optical device 43 reflects a blue color light component of the light beam irradiated by the integrator illuminating optical device 42 and transmits a red color light component and a green color light component of the light beam. The blue color light reflected by the dichroic mirror 431 is reflected by the reflecting mirror 433. The reflected blue color light passes through a field lens 425 and reaches a later-described blue liquid crystal panel of the optical device 45.

The field lens 425 converts the partial light beams irradiated from the second lens array 422 into a light beam parallel to a central axis (a main beam) of the partial light beams. The field lenses 425 disposed on light beam incident sides of the green and red liquid crystal panels function in the same manner.

Out of the red color light and the green color light which have passed through the dichroic mirror 431, the green color light is reflected by the dichroic mirror 432. The reflected green color light passes through the field lens 425 and reaches a later-described green liquid crystal panel of the optical device 45. The red color light passes through the dichroic mirror 432, the relay optical device 44 and the field lens 425 and reaches a later-described red liquid crystal panel of the optical device 45.

Note that the relay optical device 44 is used for the red color light in order to avoid deterioration in light utilization efficiency due to light dispersion and the like which may be caused by a longer optical path of the red color light than those of the other colors. In short, the relay optical device 44 is used such that partial light beams incident on the incident-side lens 441 can be conveyed as-is to the field lens 425.

As shown in FIG. 1, the optical device 45 includes the three liquid crystal panels 451 as optical modulators (the red liquid crystal panel 451R, the green liquid crystal panel 451G and the blue liquid crystal panel 451B), incident-side polarization plates 452 disposed on the light beam incident sides of the liquid crystal panels 451, emitting-side polarization plates 453 disposed on light beam emitting sides of the liquid crystal panels 451, and a cross dichroic prism 454.

The incident-side polarization plates 452 only transmit polarized light having the substantially same polarization direction as that of the polarization converter 423 out of the color light separated by the color separating optical device 43 and absorbs the other light beams. Although not specifically shown, the incident-side polarization plates 452 each have a structure in which a polarization film is adhered on a transparent substrate.

The liquid crystal panels 451 each have a structure in which liquid crystal as an electrooptic material sealed in a pair of transparent glass substrates. The liquid crystal panels 451 each control an orientation of the liquid crystal in the image formation area in accordance with image information and modulate a polarization direction of a polarized light beam irradiated from the respective incident-side polarization plates 452.

The emitting-side polarization plates 453 each have the substantially same structure as that of the incident-side polarization plates 452. The emitting-side polarization plates 453 only transmit a light beam irradiated from the respective image formation areas of the respective liquid crystal panels 451 and absorbs the other light beams.

The cross dichroic prism 454 combines the optical images that are irradiated by the emitting-side polarization plates 453 and modulated for each color light, thereby forming a color image. The cross dichroic prism 454 has a square shape in plane view with four right-angle prisms attached with each other, and two dielectric multi-layered films are formed on the boundaries adhering the respective right-angle prisms. The dielectric multi-layered films reflect the color light irradiated from the liquid crystal panel 441G and passed through the emitting-side polarization plate 453 and reflects the color light irradiated from the liquid crystal panels 451G, 451B and passed through the emitting-side polarization plates 453. Thus, the three types of color light are combined into one color image. The color image formed by the cross dichroic prism 454 is projected in an enlarged manner by the above-described projection lens 3 onto a screen or the like.

Structure of Optical Source Device

Figure 2:
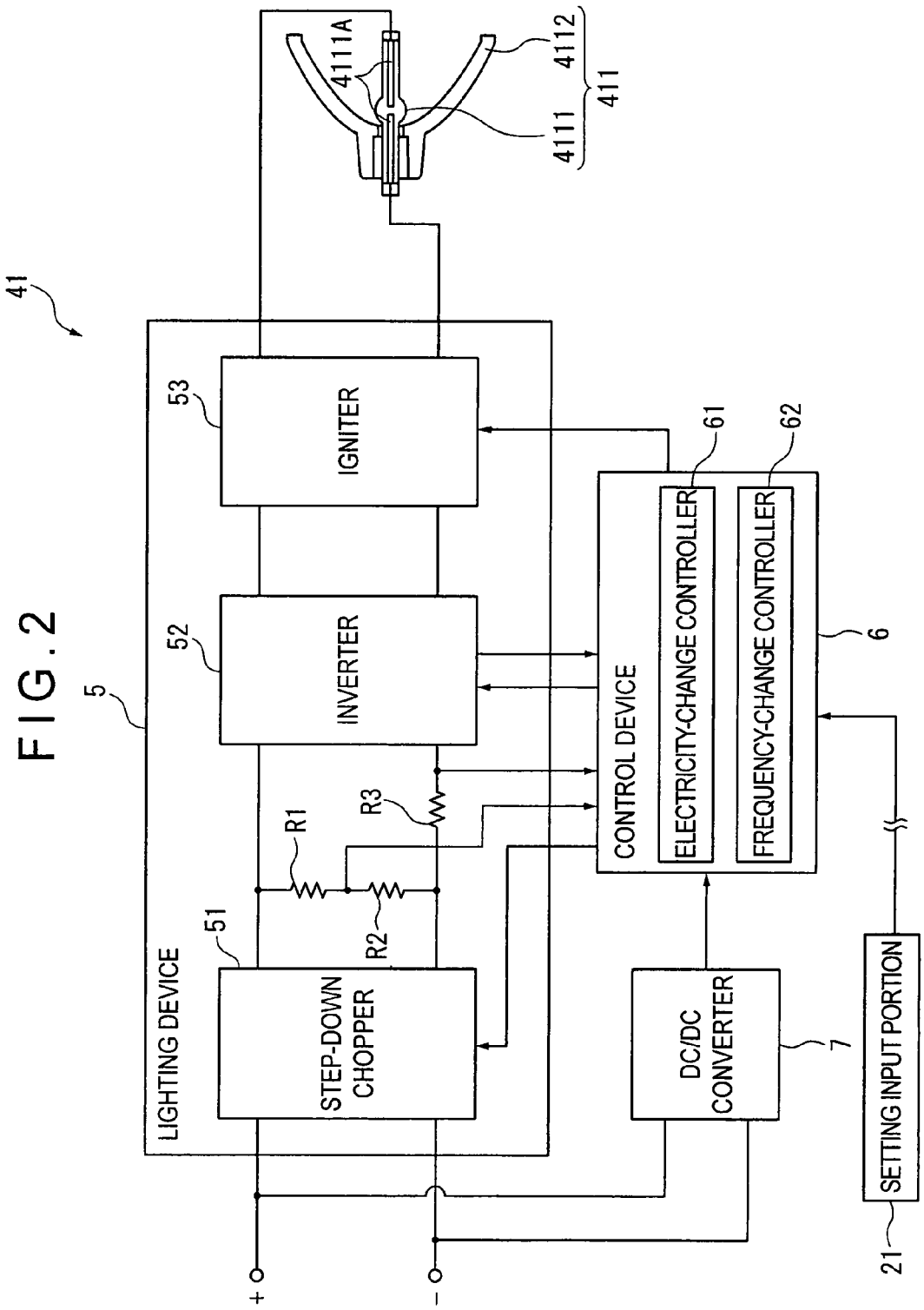
FIG. 2 is a block diagram schematically showing a structure of a light source device of the first exemplary embodiment.

FIG. 2 is a block diagram schematically showing a structure of the light source device 41.

As shown in FIG. 2, the light source device 41 includes the light source device main body 411, the lighting device 5, the control device 6 and the like.

The lighting device 5 lights and drives the light source lamp 4111 and includes a step-down chopper 51, an inverter 52 and an igniter 53 as shown in FIG. 2.

The step-down chopper 51 is connected with the above-described power source unit, to which a direct voltage is input and lowered to a direct voltage of an appropriate value before being supplied to the inverter 52. Although not specifically shown, the step-down chopper 51 is a general chopper circuit including a diode, a choke coil, a capacitor, a switching element and the like. Specifically, a duty ratio (a ratio of ON time per unit time to OFF time per unit time) of the switching element is adjusted under the control of the control device 6, so that current (drive current) or power (drive power) which is supplied to the inverter 52 (the light source lamp 4111) is controlled. On an output side of the step-down chopper 51, resistors R1, R2 are parallel-connected. An electric potential on a connecting point of the resistors R1, R2 is supplied to the control device 6 as an output voltage of the step-down chopper 51. A resistor R3 is tandem-connected on a negative electric potential side of the step-down chopper 51. Current flowing through the resistor R3 is detected as the drive current to be supplied to the control device 6.

The inverter 52 converts the direct current supplied from the step-down chopper 51 into alternating current of a predetermined frequency to be supplied to the light source lamp 4111. Although not specifically shown, the inverter 52 is a general full-bridge circuit including four switching elements and the like which are full-bridge connected. Specifically, a frequency of the alternating current (the drive current) supplied to the light source lamp 4111 is controlled by adjusting a timing at which two switching elements and the other two switching elements are alternately switched between ON and OFF.

The igniter 53 includes a pressure rising circuit (not shown). When the light source lamp 4111 is actuated, the igniter 53 applies, under the control of the control device 6, a high-voltage pulse between the pair of electrodes 4111A to cause a dielectric breakdown, thereby forming a discharge path.

The control device 6 is a microprocessor, for example, which controllably drives the lighting device 5 in accordance with a control program stored in a memory (not shown). As shown in FIG. 2, the control device 6 is connected with a DC/DC converter 7 and driven by a drive voltage generated by the DC/DC converter 7. The DC/DC converter 7 is connected with the above-described power source unit so that a direct voltage is input, where the input voltage is converted to a direct voltage of an appropriate value to be supplied to the control device 6.

Although not specifically shown, the control device 6 includes an external control interface for obtaining a control signal from the outside and is connected with the control board via the external control interface.

When a user operates a setting input portion 21 such as an operation panel or the like provided to the exterior casing 2 for "turning a power source of the projector ON", a power source ON signal is output to the control board from the setting input portion 21 (FIG. 2). A control signal for "starting a lighting of the light source lamp 4111" is output from the control board to the control device 6. In accordance with the control signal from the control board, the control device 6 starts to controllably drive the lighting device 5.

A predetermined operation signal is output to the control board from the setting input portion 21 by an operation by the user for "changing the drive power (rated power (first power), low power (second power)) of the light source lamp". A control signal as power change information for "changing the drive power of the light source lamp to the rated power or the low power" is output from the control board to the control device 6. In accordance with the control signal from the control board, the control device 6 changes the controllable drive of the lighting device 5 and changes the drive power that is supplied from the lighting device 5 to the light source lamp 4111.

As shown in FIG. 2, the control device 6 includes a power-change controller 61, a frequency-change controller 62 and the like.

In accordance with a control program and a control signal from the control board, the power-change controller 61 recognizes the electric potential on the connecting point of the resistors R1, R2 (the output voltage of the step-down chopper 51) and the current flowing in the resistor R3 (the drive current), outputs a predetermined drive signal to the step-down chopper 51 to adjust the duty ratio of the switching element of the step-down chopper 51 and controls the drive power that is supplied from the lighting device 5 to the light source lamp 4111.

In the first exemplary embodiment, when the frequency is set as described below (for example, before shipping of the projector 1), the power-change controller 61 can change the drive power that is supplied from the lighting device 5 to the light source lamp 4111 into various types of drive power in accordance with the control signal from a later-described frequency setting device. When the light source device 41 is lighted and driven as described below (for example, after shipping of the projector 1), a predetermined control program is stored in the memory (not shown) and the power-change controller 61 conducts a power change control for rated drive (first power drive) and low power drive (second power drive) in accordance with the control program and a control signal from the control board. In the rated drive mode, the drive power that is supplied from the lighting device 5 to the light source lamp 4111 is set to the rated power. In the low power drive mode, the drive power is set to the low power that is lower than the rated power.

A limit value of the drive current that is supplied from the lighting device 5 to the light source lamp 4111 is stored in a memory (not shown). The power-change controller 61 controls the drive power that is supplied from the lighting device 5 to the light source lamp 4111 such that the current (the drive power) flowing in the resistor R3 does not exceed the limit value.

In accordance with the control program, the frequency-change controller 62 outputs a predetermined drive signal to the inverter 52 to adjust the timing at which the two switching elements and the other two switching elements of the inverter 52 are alternately switched between ON and OFF, thereby controlling the frequency of the drive current that is supplied from the lighting device 5 to the light source lamp 4111.

In the first exemplary embodiment, when the frequency is set as described below (for example, before shipping of the projector 1), the frequency-change controller 62 can change the frequency of the drive current that is supplied from the lighting device 5 to the light source lamp 4111 to various frequencies in accordance with a control command from the above-described frequency setting device. When the light source device 41 is lighted and driven as described below (for example, after shipping of the projector 1), a predetermined control program is stored in a memory (not shown) and the frequency-change controller 62 changes in accordance with the control program the frequency of the power each time when the power is changed by the power-change controller 61. More specifically, in accordance with the control program, the frequency-change controller 62 conducts a frequency change control in which the frequency of the drive current that is supplied from the lighting device 5 to the light source lamp 4111 is changed to a predetermined frequency in the rated drive mode (hereinafter referred to as a rated drive frequency) or to a frequency higher than the rated drive frequency in the low-power drive mode (hereinafter referred to as a low power drive frequency).

Operation of Optical Source Device

Next, an operation of the above-described light source device 41 will be described below with reference to the drawings.

Note that a setting method of the above-described rated drive frequency and the low power drive frequency will be described first, and then a lighting and driving method of the light source device 41 will be described.

Setting Method of Frequency

Figure 3:
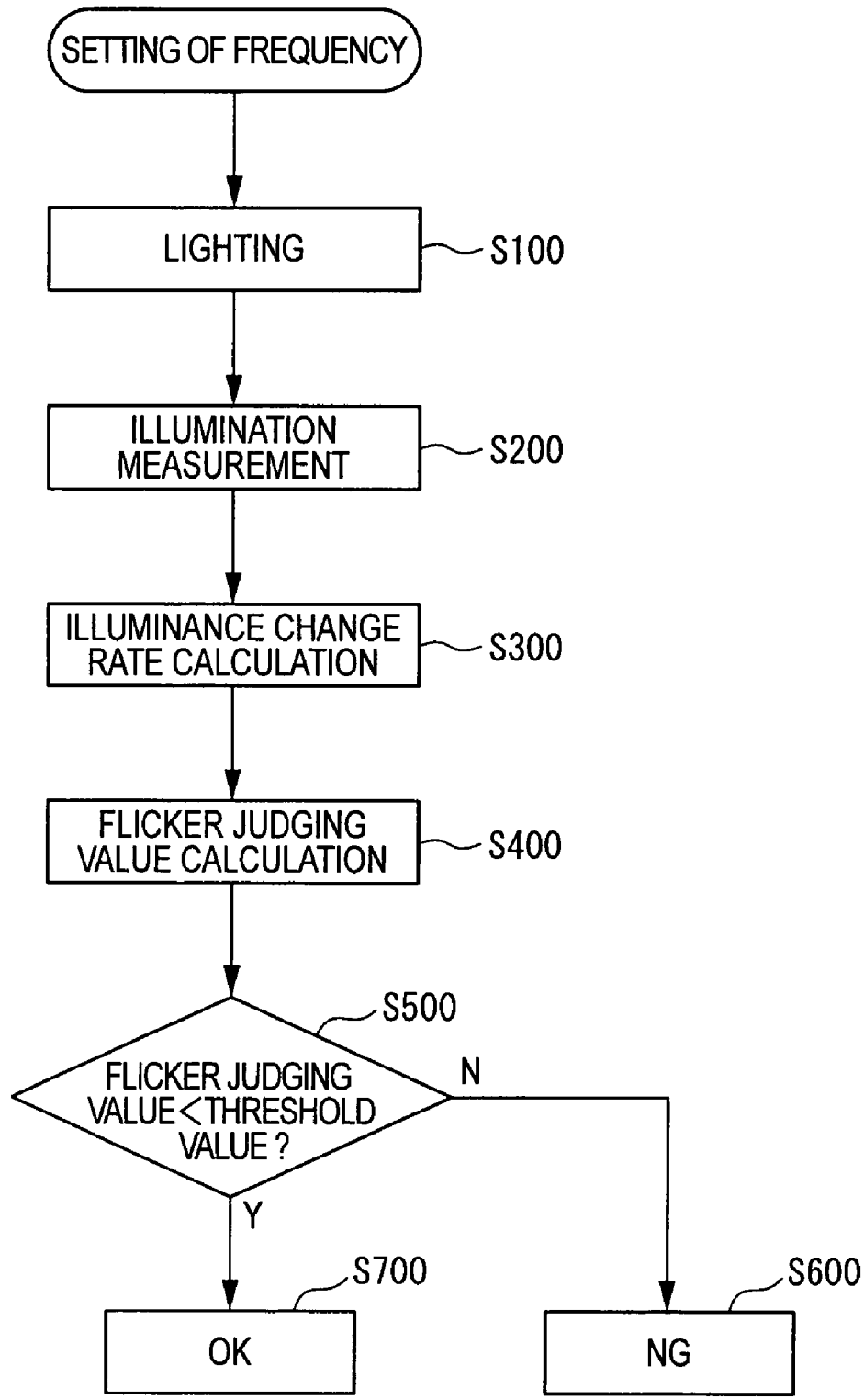
FIG. 3 is a flowchart for explaining a setting method of a frequency of the first exemplary embodiment.

FIG. 3 is a flowchart for explaining a setting method of a frequency.

In the description below, the light source device 41 of which frequency is set is mounted in the projector 1. A frequency setting device 100 (see FIG. 4) is used for setting the frequency.

Figure 4:
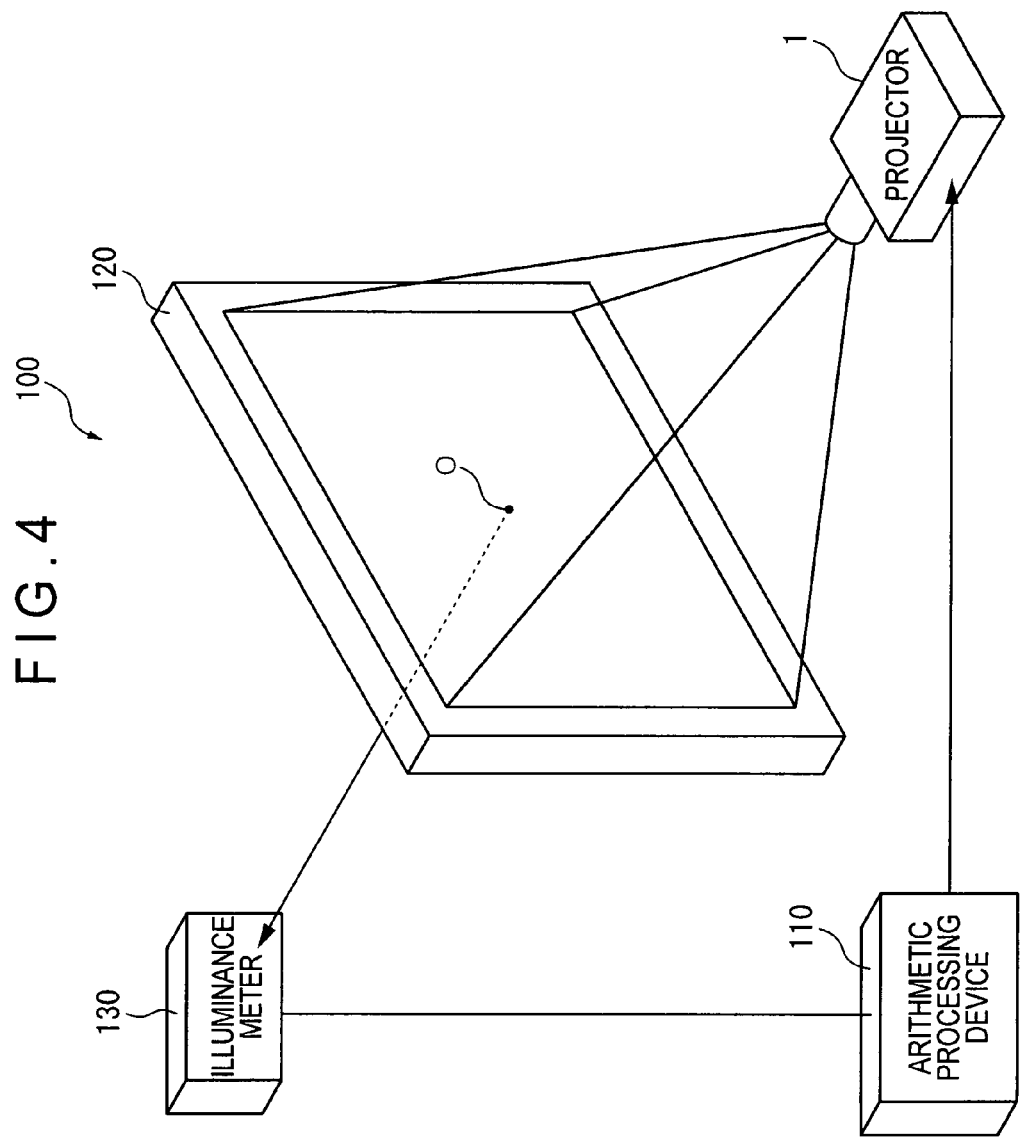
FIG. 4 is a block diagram schematically showing a frequency setting device of the first exemplary embodiment.

FIG. 4 is a block diagram schematically showing the frequency setting device 100.

As shown in FIG. 4, the frequency setting device 100 includes an arithmetic processing device 110 such as a personal computer having a CPU, a hard disk and the like, a screen 120 on which an optical image is projected from the projector 1 in an enlarged manner and an illuminance meter 130 that measures illuminance of a substantially center position O of a projection image projected on the screen 120.

The arithmetic processing device 110 is connected with the control board of the projector 1 via a predetermined interface and outputs a predetermined control command to the projector 1 to controllably drive the projector 1. The arithmetic processing device 110 is electrically connected with the illuminance meter 130 and outputs a predetermined control command to the illuminance meter 130 to controllably drive the illuminance meter 130 and thereby to sequentially input the illuminance that is measured by the illuminance meter 130.

Firstly, an operator operates an operation portion (not shown) of the arithmetic processing device 110 to set the drive power supplied to the light source lamp 4111 to predetermined power (rated power or low power). Then, the operator sets the frequency of the drive current supplied to the light source lamp 4111 to a predetermined frequency. When the operator conducts an operation on the operation portion for "driving the light source device at the set drive power and frequency", a predetermined control command is output from the arithmetic processing device 110 to the projector 1. In accordance with the control signal, the control board of the projector 1 outputs a predetermined control signal to the control device 6. Subsequently, the control device 6 controllably drives the lighting device 5 such that the drive current of the rated power or the low power and the predetermined frequency is supplied from the lighting device 5 to the light source lamp 4111, thereby lighting the light source lamp 4111 (Step S100).

In accordance with the control command, the control board controllably drives the liquid crystal panels 451 such that a white image is formed on each liquid crystal panel 451. Then, the white images are projected from the projector 1 to the screen 120 in an enlarged manner, so that a white image is projected on the screen 120.

In Step S100, when a predetermined time period (for example, 10 minutes) has elapsed from the lighting of the light source lamp 4111, the arithmetic processing device 110 outputs a predetermined control command to the illuminance meter 130 in order to operate the illuminance meter 130 to measure illuminance of a substantially center position of the white image projected on the screen 120 at a predetermined interval (for example, 200 ms) for a predetermined time period (for example, 10 minutes) (Step S200). The illuminance measured by the illuminance meter 130 is sequentially output to the arithmetic processing device 110. The arithmetic processing device 110 stores illuminance data in which illuminance and measuring time are associated with each other in a memory (not shown).

Subsequent to Step S200, the arithmetic processing device 110 reads out the illuminance data stored in the memory and calculates an illuminance change rate as a change rate of illuminance measured by the illuminance meter 130 (Step S300).

Specifically, as exemplified in Table 1, the arithmetic processing device 110 recognizes the measuring time of each illuminance (data No.) and calculates, as the illuminance change rate (%), the change rate of illuminance between to-be-calculated illuminance and the illuminance measured right before the to-be-calculated illuminance.

TABLE 1

| Data No. | Illuminance | Illuminance Change Rate |
|---|---|---|
| 100 | 5000 | — |
| 101 | 5050 | 1.00% |
| 102 | 5100 | 0.99% |
| 103 | 5080 | −0.39% |

Subsequent to Step S300, based on the calculated illuminance change rate, the arithmetic processing device 110 calculates a flicker judging value for judging whether or not a flicker exists in a light beam irradiated from the light source device 41 (Step S400).

Specifically, the frequency setting device 100 recognizes a maximum value and a minimum value of the calculated illuminance change rate and calculates the flicker judging value by subtracting the minimum value from the maximum value.

Subsequent to Step S400, the arithmetic processing device 110 compares the calculated flicker judging value with a threshold value (for example, 3%) stored in a memory (not shown), thereby judging whether or not the flicker judging value is smaller than the threshold value (Step S500).

In Step S500, when the arithmetic processing device 110 judges "N", namely when the arithmetic processing device 110 judges that the flicker judging value is equal to or larger than the threshold value, it is judged that a flicker exists in the light beam irradiated from the light source device 41 (NG) (Step S600).

On the other hand, in Step S500, when the arithmetic processing device 110 judges "Y", namely when the arithmetic processing device 110 judges that the flicker judging value is smaller than the threshold value, it is judged that no flicker exists in the light beam irradiated from the light source device 41 (OK) (Step S700).

The above-described Steps S100 to S700 are conducted for each of a plurality of new light source devices 41 (having a common structure), the light source devices being set with a different frequency in Step S100 (hereinafter referred to as a first process).

Subsequently, Steps S200 to S700 are re-conducted for the light source device 41 that has been judged "OK" in Step S700 out of the plurality of light source devices that has experienced the first process (hereinafter refereed to as a second process). In Step S100 in the second process, the light source lamp 4111 is kept lighted and Steps S200 to S700 are re-conducted when the light source device 41 reaches an end period of its life duration of guarantee that is preset.

The most appropriate frequency out of the drive condition (the frequency) of at least one light source device 41 that has been judged "OK" in Step S700 in the second process is selected and set as the rated drive frequency or the low power drive frequency of the light source device 41.

FIGS. 5A, 5B and 6A to 6C each show an example of a behavior of the illuminance change rate. Specifically, FIG. 5 shows a behavior of the illuminance change rate when the first process is conducted (when the light source device 41 is new). FIG. 6 shows a behavior of the illuminance change rate when the second process is conducted (when the light source device 41 is at its end period of the life duration of guarantee).

Figure 5A:
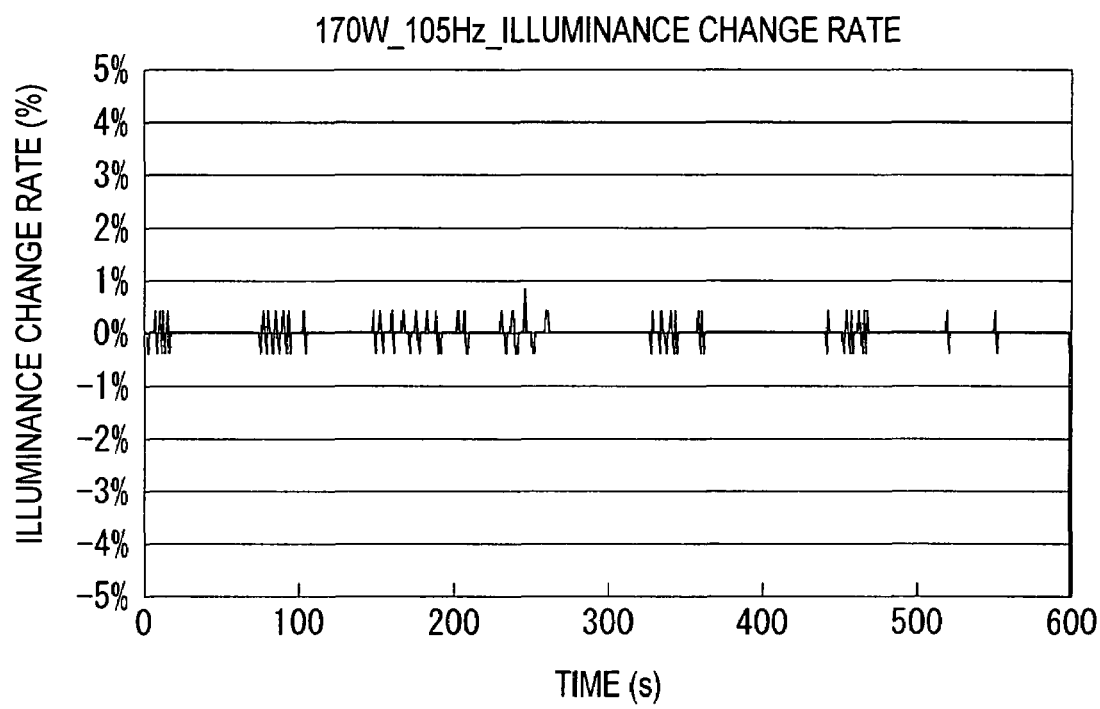
FIG. 5A shows an example of a behavior of an illuminance change rate of the first exemplary embodiment.
Figure 5B:
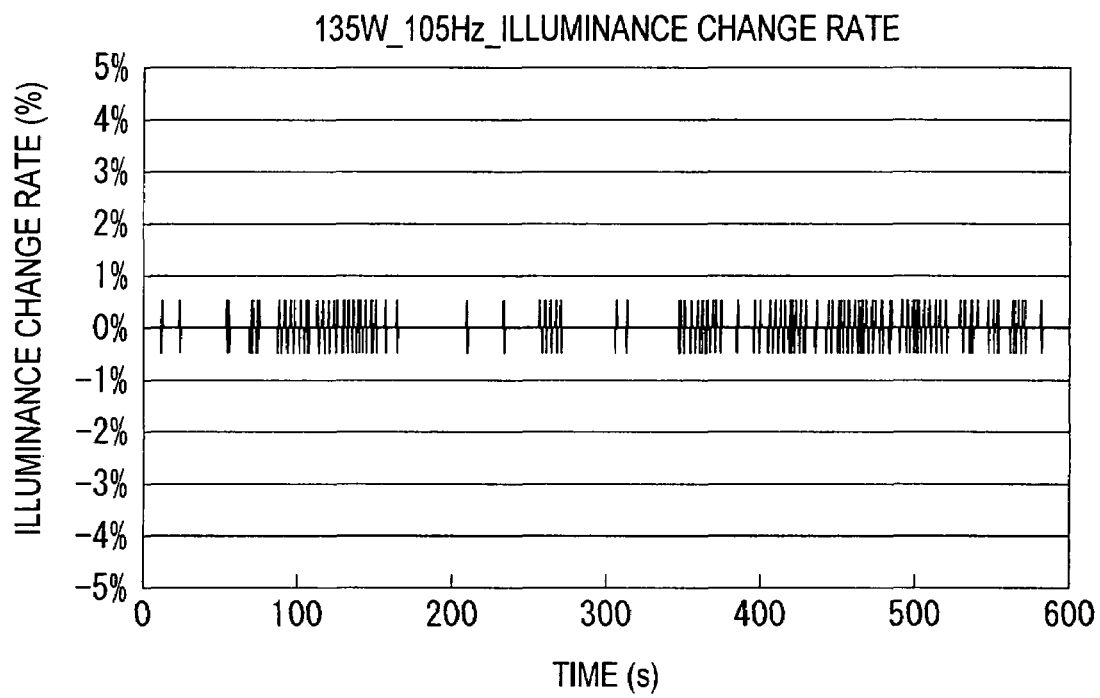
FIG. 5B shows an example of the behavior of the illuminance change rate of the first exemplary embodiment.
Figure 6A:
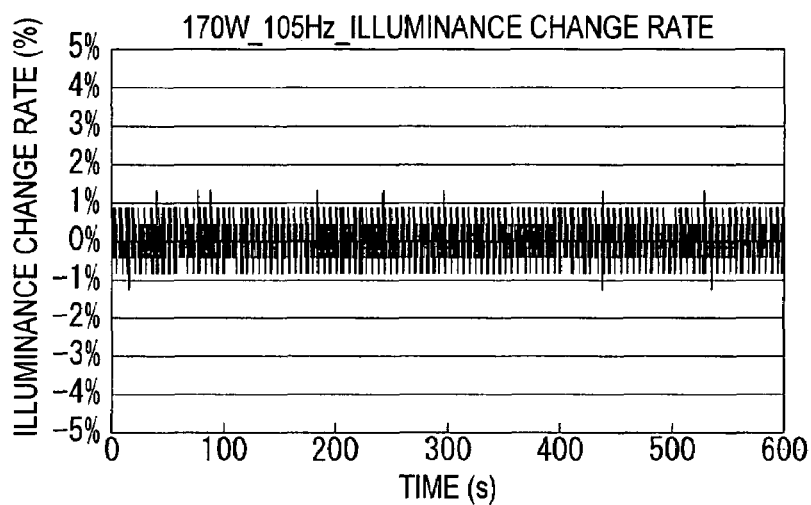
FIG. 6A shows an example of the behavior of the illuminance change rate of the first exemplary embodiment.
Figure 6B:
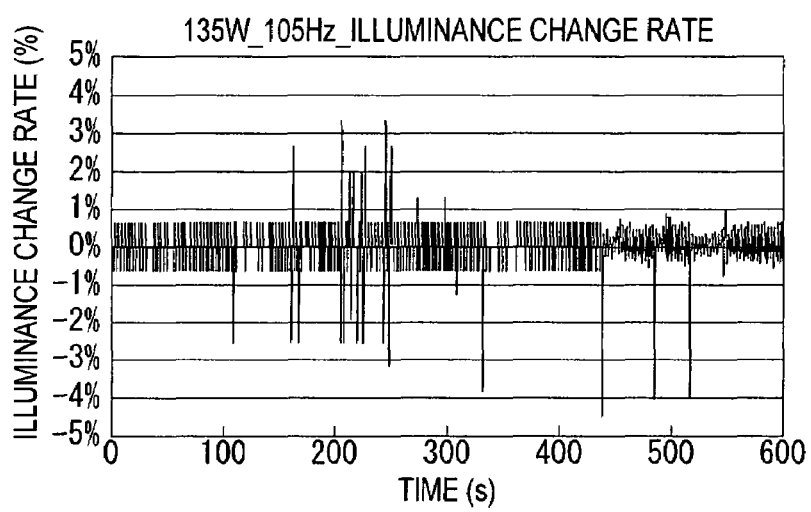
FIG. 6B shows an example of the behavior of the illuminance change rate of the first exemplary embodiment.

FIGS. 5A and 6A each show a behavior of the illuminance change rate of one light source device 41 that has been judged "OK" in Step S700 in both of the first and second processes out of the plurality of light source devices 41 that are driven at the drive power set to the rated power (170 W). In the first exemplary embodiment, the frequency of 105 Hz that is the drive condition of the light source device 41 exemplified in FIGS. 5 and 6 out of the drive condition (the frequency) of the at least one light source device 41 that has been judged "OK" in Step S700 in the second process is selected and set as the rated drive frequency.

Exemplified in FIG. 5B is a behavior of the illuminance change rate of the light source device 41 of which frequency is set to the rated drive frequency (105 Hz) out of the plurality of light source devices 41 driven at the drive power set to the low power (135 W). As exemplified in FIG. 5B, when the first process is conducted for the light source device 41 driven at the above-described drive condition (the low power of 135 W, the rated drive frequency of 105 Hz), the behavior of the illuminance change rate is small, so that the light source device 41 is judged "OK" in Step S700. However, as exemplified in FIG. 6B, when the second process is conducted for the light source device 41 driven at the above-described drive condition, the behavior of the illuminance change rate is large, so that the light source device 41 is judged "NG" in Step S700.

Figure 6C:
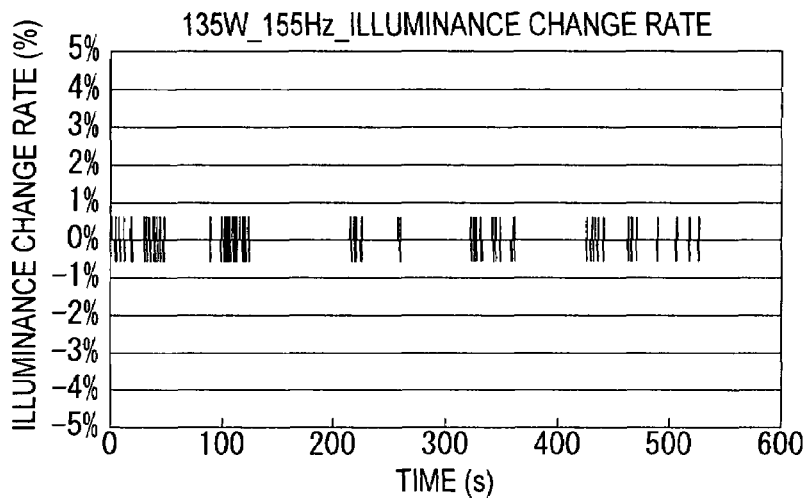
FIG. 6C shows an example of the behavior of the illuminance change rate of the first exemplary embodiment.

Exemplified in FIG. 6C is a behavior of the illuminance change rate of the light source device 41 of which frequency is set to 155 Hz (a value higher than the rated drive frequency of 105 Hz) out of the plurality of light source devices 41 driven at the drive frequency of the low power (135 W) similarly to FIGS. 5A and 5B. As exemplified in FIG. 6C, when the second process is conducted for the light source device 41 driven at the above-described drive condition (the low power of 135 W, the frequency of 155 Hz), the behavior of the illuminance change rate is small, so that the light source device 41 is judged "OK" in Step S700. In the first exemplary embodiment, the frequency of 155 Hz (a frequency higher than the rated drive frequency) that is the drive condition of the light source device 41 exemplified in FIG. 6C out of the drive condition (the frequency) of the at least one light source device 41 that has been judged "OK" in Step S700 in the second process is selected to be set as the low power drive frequency.

Lighting and Driving Method of Optical Light Source

Figure 7:
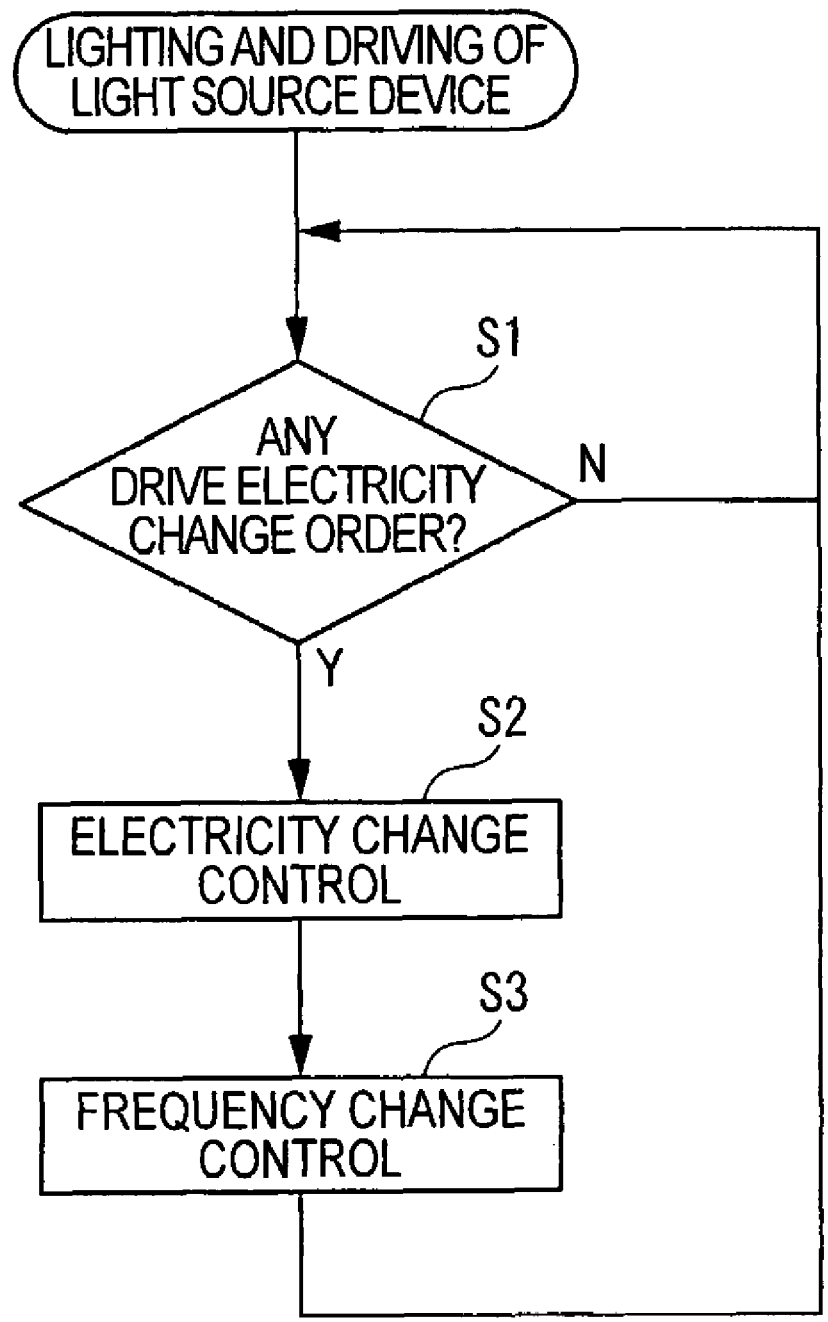
FIG. 7 is a flowchart for explaining a lighting and driving method of the light source device of the first exemplary embodiment.

FIG. 7 is a flowchart for explaining a lighting and driving method of the light source device 41.

Figure 8:
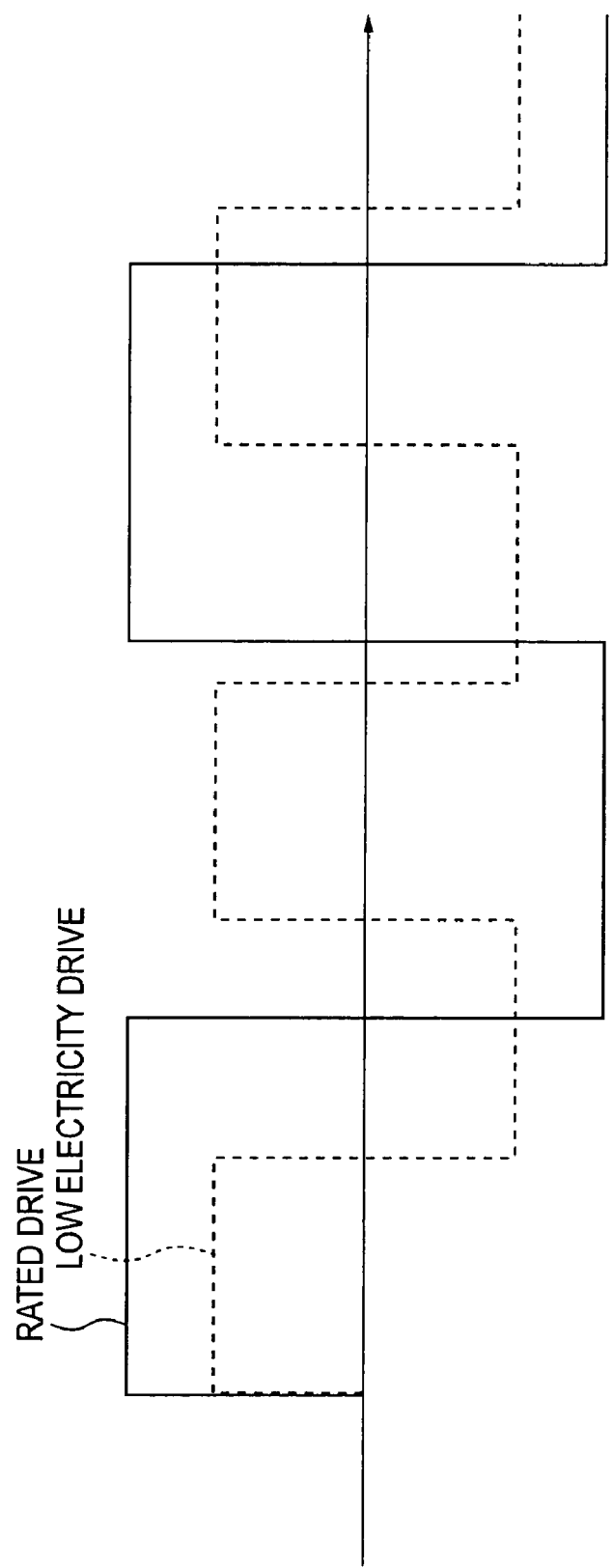
FIG. 8 is an illustration for explaining the lighting and driving method of the light source device of the first exemplary embodiment.

FIG. 8 is an illustration for explaining the lighting and driving method of the light source device 41. Specifically, FIG. 8 shows a waveform of the drive power supplied from the lighting device 5 to the light source lamp 4111.

Note that, in the description below, it is premised that the rated drive frequency and the low power drive frequency are set in advance by the above-described setting method of the frequency. It is also premised that the projector 1 has been activated by an operation conducted by the user on the setting input portion 21; and the light source device 41 has been lighted and driven.

The control device 6 constantly monitors whether or not a predetermined control signal is output from the control board by an operation for "changing the drive power of the light source device" by the user on the setting input portion 21 and whether or not the control device 6 receives power change information (i.e. whether or not a change order for the drive power is given) (Step S1: power-change-information acquiring step).

In Step S1, when the control device 6 acquires the power change information from the control board, in accordance with the control program, the control device 6 outputs the drive signal to the lighting device 5 to conduct the above-described power change control (Step S2: power changing step) and the frequency change control (Step S3: frequency changing control), thereby operating the lighting device 5 in a below-described manner.

For example, when the lighting device is driven in the rated drive mode, the power change control in Step S2 adjusts the duty ratio of the switching element of the step-down chopper 51, thereby changing the drive power supplied to the light source lamp 4111 from the rated power (170 W) to the low power (135 W) as shown in FIG. 8. The frequency change control in Step S3 adjusts the ON/OFF timing of the inverter 52 at which the two switching elements and the other two switching elements are alternately switched ON/OFF and the frequency of the drive current supplied to the light source lamp 4111 is changed from the rated drive frequency (105 Hz) to the low power drive frequency (155 Hz) that is higher than the rated drive frequency as shown in FIG. 8. Then, the drive is switched from the rated drive mode to the low power drive mode.

For another example, when the lighting device is driven in the low power drive mode, the power change control in Step S2 adjusts the duty ratio of the switching element of the step-down chopper 51 and changes the drive power supplied to the light source lamp 4111 from the low power (135 W) to the rated power (170 W). The frequency change control in Step S3 adjusts the ON/OFF timing of the inverter 52 at which the two switching elements and the other two switching elements are alternately switched ON/OFF and the frequency of the drive current supplied to the light source lamp 4111 is changed from the low power drive frequency (155 Hz) to the rated drive frequency (105 Hz) that is higher than the low power drive frequency as shown in FIG. 8. Then, the drive is switched from the low power drive to the rated drive.

As described above, the control device 6 switches between the rated drive and the low power drive in accordance with an acquirement of the power change information.

The first exemplary embodiment provides exemplary advantages discussed below.

In the first exemplary embodiment, the control device 6 includes the power-change controller 61 and the frequency-change controller 62. In the rated drive mode, the control device 6 controls such that the light source lamp 4111 is supplied with the drive power of the rated power (170 W) higher than the low power (135 W) in the low power drive mode and the rated drive frequency (105 Hz) lower than the low power drive frequency (155 Hz) in the low power drive mode. Accordingly, in the rated drive mode, since the light source lamp 4111 is supplied with relatively large rated power (170 W), a reduction in the temperature of the electrodes 4111A of the light source lamp 4111 can be suppressed. In addition, since the light source lamp 4111 is supplied with the drive current of relatively low rated drive frequency (105 Hz), a formation of the unnecessary second projection other than the first projection (the discharge origin) on the electrodes 4111A can be avoided. Hence, in the rated drive mode, it is possible to appropriately avoid a flicker caused by the temperature reduction of the electrodes 4111A and a flicker caused by a formation of the second flicker formed on the electrodes 4111A. Further, in the rated drive mode, since the light source lamp 4111 is supplied with the drive current of relatively low rated drive frequency (105 Hz), wear of the tip end of the electrodes 4111A of the light source lamp 4111 can be avoided, thereby increasing the longevity of the light source lamp 4111.

Thus, a flicker can be appropriately avoided in the rated drive mode. However, in the low power drive mode, it is not possible to suppress the reduction in the temperature of the electrodes 4111A when, for example, the light source lamp 4111 is supplied with the low power (135 W) lower than the rated power (170 W) with the rated drive frequency set to the same as the rated drive frequency (105 Hz) in the rated drive mode for example. This is because the frequency of the drive current supplied to the light source lamp 4111 becomes relatively low.

In the first exemplary embodiment, in the low power drive mode, the control device 6 controls such that the light source lamp 4111 is supplied with the drive current of the low power (135 W) lower than the rated power (170 W) in the rated drive mode and the low power drive frequency (155 Hz) higher than the rated drive frequency (105 Hz) in the rated drive mode. In the low power drive mode, since the high pressure discharge lamp is supplied with the drive current of the low power drive frequency (155 Hz) that is relatively large, the reduction in the temperature of the electrodes 4111A of the light source lamp 4111 can be suppressed.

Hence, a flicker can be appropriately avoided in both of the rated drive mode and the low power drive mode.

Further, in the rated drive mode and the low power drive mode, since the waveform of the drive power supplied from the lighting device 5 to the light source lamp 4111 is a rectangular wave, the light source lamp 4111 can be supplied with the drive power and the drive current of constant peak values over each half cycle. Hence, luminance of the light beam irradiated from the light source lamp 4111 will not vary. Additionally, as compared with an arrangement in which the drive power or the drive current is increased, for example, right before a reverse of polarity, damage on the electrodes 4111A can be avoided, thereby increasing the longevity of the light source lamp 4111.

Note that the rated drive frequency and the low power drive frequency have been preset at frequencies that can avoid a flicker for a predetermined time period using the frequency setting device 100. Hence, a flicker can be reliably avoided either in the rated drive mode or in the low power drive mode.

Since the projector 1 includes the light source device 41 that can increase the longevity of the light source lamp 4111, the longevity of the projector 1 can be also increased.

Further, the projector 1 includes the light source device 41 that can avoid a flicker, so that an appropriate projection image including no flicker can be formed.

Second Exemplary Embodiment

A second exemplary embodiment of the invention will be described below with reference to the drawings.

In the description below, the same structures and the components as the first exemplary embodiment are given the same reference numerals, thereby omitting and simplifying detailed explanation thereof.

The second exemplary embodiment differs from the first exemplary embodiment only in the setting method of the frequency (the rated drive frequency, the low power drive frequency). The arrangements of the light source device 41 and the projector 1 are similar to those of the first exemplary embodiment.

Figure 9:
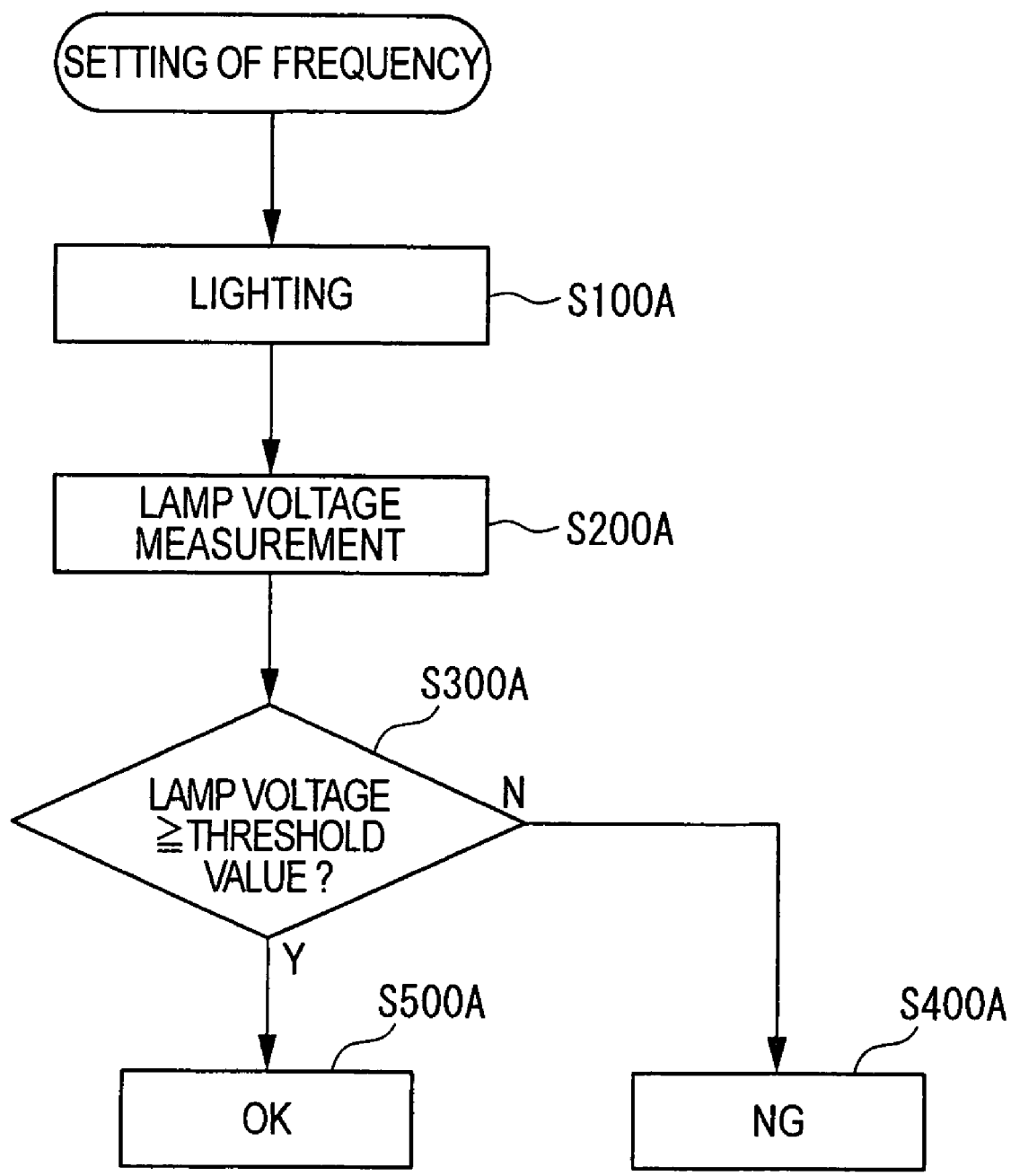
FIG. 9 is a flowchart for explaining a setting method of a frequency of a second exemplary embodiment.

FIG. 9 is a flowchart for explaining a frequency setting method according to the second exemplary embodiment.

Figure 10:
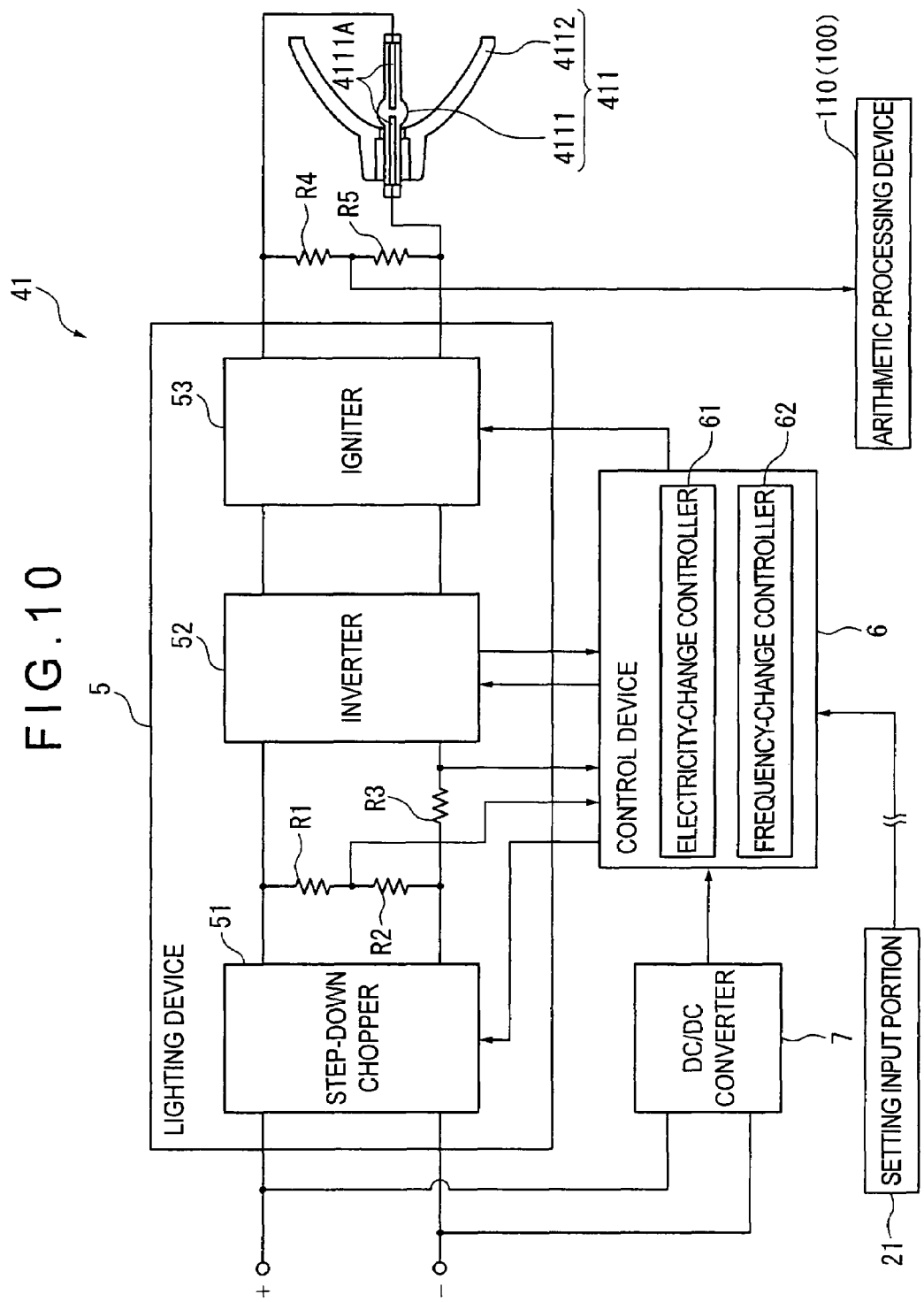
FIG. 10 is an illustration for explaining the setting of the frequency of the second exemplary embodiment.

FIG. 10 is an illustration for explaining the frequency setting method.

Note that the light source device 41 of which frequency is to be set in the second exemplary embodiment differs from the first exemplary embodiment in that the light source device 41 is not installed inside the projector 1 but is used as a single piece (including only the light source lamp 4111, the lighting device 5, the control device 6 and the DC/DC converter 7). In the frequency setting, the frequency setting device 100 is used as in the first exemplary embodiment.

Although not specifically shown, as another difference from the first exemplary embodiment, the second exemplary embodiment only employs the arithmetic processing device 110 as the frequency setting device 100 and omits the screen 120 and the illuminance meter 130.

Similarly to the first exemplary embodiment, the arithmetic processing device 110 is connected with the control board of the projector 1 via a predetermined interface, the arithmetic processing device 110 outputting a predetermined control command to the projector 1 to controllably drive the projector 1. The arithmetic processing device 110 is adapted to acquire a lamp voltage applied to the light source lamp 4111. For example, as shown in FIG. 10, the lamp voltage can be acquired by providing to the lighting device 5 with a voltage detecting circuit in which resistors R4, R5 are parallel-connected on an output side of the igniter 53 and an electric potential on a connecting point of the resistors R4, R5 is detected as the lamp voltage of the light source lamp 4111. The lamp voltage detected by the voltage detecting circuit is supplied to the arithmetic processing device 110.

Firstly, an operator operates the operation portion (not shown) of the arithmetic processing device 110 to set the drive power supplied to the light source lamp 4111 at a predetermined power (the rated power or the low power). Then, the operator sets the frequency of the drive current supplied to the light source lamp 4111 at a predetermined frequency. When the operator conducts an operation on the operation portion for "driving the light source device at the set drive power and frequency", a predetermined control command is output from the arithmetic processing device 110 to the projector 1. In accordance with the control signal, the control board of the projector 1 outputs a predetermined control signal to the control device 6. Subsequently, the control device 6 controllably drives the lighting device 5 such that the drive current of the rated power or the low power and the predetermined frequency is supplied from the lighting device 5 to the light source lamp 4111, thereby lighting the light source lamp 4111 (Step S100A).

In Step S100A, the arithmetic processing device 110 sequentially acquires the lamp voltage applied to the light source lamp 4111 for a predetermined time period (for example, fifty hours) after the lighting of the light source lamp 4111 (Step S200A). The arithmetic processing device 110 stores the acquired lamp voltage in a memory (not shown).

Subsequent to Step S200A, the arithmetic processing device 110 compares the acquired lamp voltage with a threshold value stored in a memory (not shown) (for example, 55V), thereby judging whether or not the lamp voltage is higher than the threshold value (Step S300A).

In Step S300A, when the arithmetic processing device 110 judges "N", namely when the arithmetic processing device 110 judges that at least one lamp voltage has a value smaller than the threshold value, the judgment result is "NG" (Step S400A).

On the other hand, in Step S300A, when the arithmetic processing device 110 judges "Y", namely when the arithmetic processing device 110 judges that all of the lamp voltages has values equal to or larger than the threshold value, the judgment result is "OK" (Step S500A).

The above-described Steps S100A to S500A are conducted for each of a plurality of new light source devices 41 (having a common structure), the light source devices being set with a different frequency in Step S100A.

In the plurality of light source devices 41 having received the Steps S100A to S500A with the above-described drive conditions (the frequencies), the most appropriate frequency out of the drive conditions (the frequencies) of at least one light source device 41 of the light source devices 41 that are judged "OK" in Step S500A is selected to be set as the rated drive frequency or the low power drive frequency.

Figure 11A:
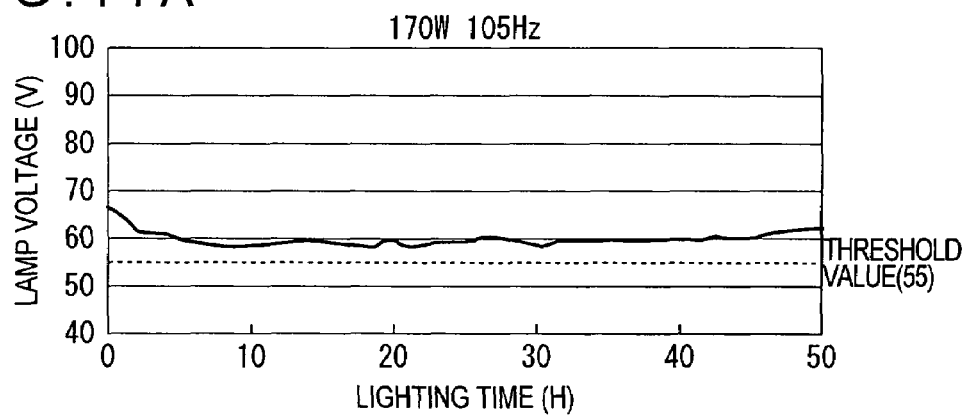
FIG. 11A shows an example of a behavior of a lamp voltage of the second exemplary embodiment.
Figure 11B:
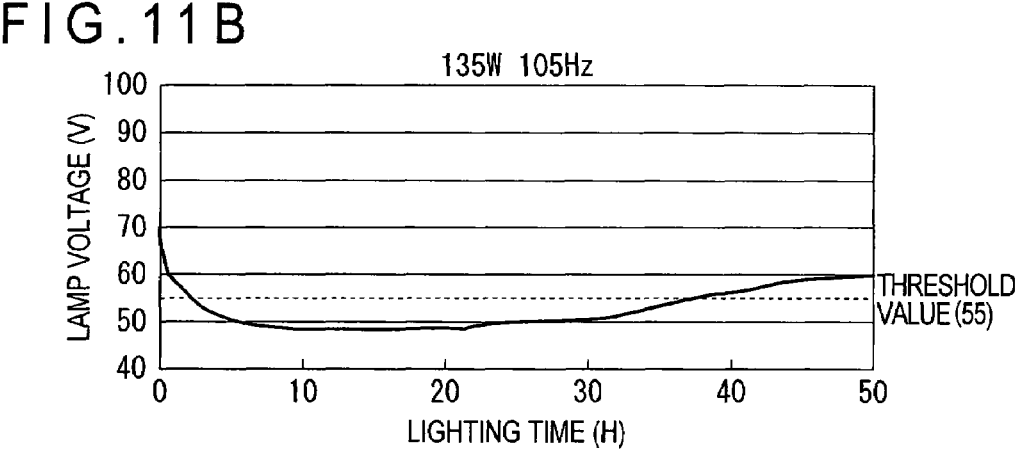
FIG. 11B shows an example of the behavior of the lamp voltage of the second exemplary embodiment.
Figure 11C:
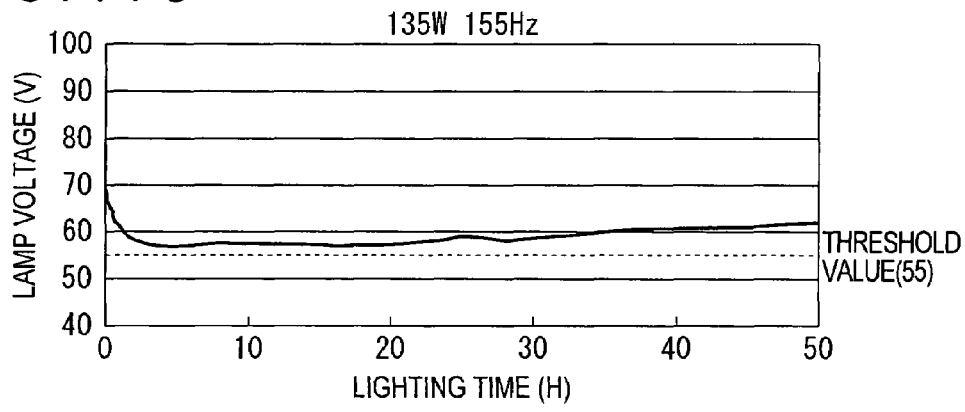
FIG. 11C shows an example of the behavior of the lamp voltage of the second exemplary embodiment.

FIGS. 11A to 11C each show an example of a behavior of the lamp voltage.

FIG. 11A shows a behavior of the lamp voltage of one light source device 41 that has been judged "OK" in Step S500A in the above-described process out of the plurality of light source devices 41 that are driven at the drive power set to the rated power (170 W). In the second exemplary embodiment, the frequency of 105 Hz that is the drive condition of the light source device 41 shown in FIG. 11A out of the drive condition (the frequency) of the at least one light source device 41 that has been judged "OK" in Step S500A in the above-described process is selected to be set as the rated drive frequency.

Exemplified in FIG. 11B is a behavior of the lamp voltage of the light source device 41 of which frequency is set to the rated drive frequency (105 Hz) out of the plurality of light source devices 41 driven at the drive power set to the low power (135 W). As exemplified in FIG. 11B, when the above-described process is conducted on the light source device 41 driven at the above-described drive condition (the low power of 135 W, the rated drive frequency of 105 Hz), the lamp voltage becomes lower than 55V, so that the judgment result is "NG" in Step S400A.

Exemplified in FIG. 11C is a behavior of the lamp voltage of the light source device 41 of which frequency is set to 155 Hz (a value higher than the rated drive frequency of 105 Hz) out of the plurality of light source devices 41 driven at the drive frequency of the low power (135 W) similarly to FIG. 11B. As exemplified in FIG. 11C, when the above-described process is conducted for the light source device 41 driven at the above-described drive condition (the low power of 135 W, the rated drive frequency of 155 Hz), the lamp voltage becomes larger than 55V, so that the judgment result is "OK" in Step S500A. In the second exemplary embodiment, the frequency of 155 Hz (a frequency higher than the rated drive frequency) that is the drive condition of the light source device 41 exemplified in FIG. 11C out of the drive condition (the frequency) of the at least one light source device 41 that has been judged "OK" in Step S500A in the second process is selected to be set as the low power drive frequency.

Note that the lighting and driving method of the light source device 41 in the second exemplary embodiment is similar to that of the first exemplary embodiment, so that an explanation thereof will be omitted herein.

The above-described second exemplary embodiment provides exemplary advantages below in addition to the advantages of the first exemplary embodiment.

In the second exemplary embodiment, the rated drive frequency and the low power drive frequency are preset at frequencies of which lamp voltage is equal to or higher than a predetermined threshold value for a predetermined time period by using the frequency setting device 100 (the arithmetic processing device 110). Accordingly, in the rated drive mode and the low power drive mode, a reduction in brightness of the light beam irradiated from the light source device 41 or a blackening will not be provoked and the drive current will not be excessively large (i.e. the drive current will be suppressed to be equal to or lower than the limit value). Thus, damage on the electrodes 4111A can be reduced, thereby increasing the longevity of the light source lamp 4111.

In setting the rated drive frequency and the low power drive frequency, the screen 120 or the illuminance meter 130 is not required as in the first exemplary embodiment, so that a work space can be made small and effectively used in the frequency setting.

Note that the scope of the invention is not limited to the above-described exemplary embodiments, and modifications, improvements and the like are also within the scope of the invention as long as an object of the invention can be obtained.

In the first and second exemplary embodiments, the power-change controller 61 changes the drive power supplied from the lighting device 5 to the light source lamp 4111 between two levels of the rated power (170 W) and the low power (135 W) lower than the rated power. However, the arrangement is not limited thereto. The drive power may be changed between two levels of a first power without the rated power and a second power lower than the first power, for example. In such an arrangement, in supplying the second power, the frequency-change controller 62 changes the frequencies of the second power to a frequency higher than the frequency in the first power drive mode. Alternatively, the drive power may be changed among three levels of the first power, the second power and a third power lower than the first and second power.

In the first and second exemplary embodiments, the switching between the rated drive and the low power drive is conducted by the operation on the setting input portion 21 by the user, but the arrangement is not limited thereto. For example, the control device 6 constituting the control board or the light source device 41 which is mounted on the projector 1 may conduct switching between the rated drive and the low power drive based on a judgment by itself, for example, when judging that no operation has been made on the setting input portion 21 for a certain time period.

In the first and second exemplary embodiments, the setting methods of the rated drive frequency and the low power drive frequency are not limited to the setting methods described in the first and second exemplary embodiments, but any other setting method may be used.

In the first and second exemplary embodiments, the structure of the light source lamp 4111 is not limited to that described in the first and second exemplary embodiments, but may be any other. For example, the light source lamp 4111 may be provided with not only the light source lamp 4111, the main reflecting mirror 4112 and the like but also a sub reflecting mirror having a reflecting surface that is disposed to face a reflecting surface of the main reflecting mirror 4112 and reflects a part of the light beam irradiated from the light source lamp 4111.

In the first and second exemplary embodiments, the projector 1 is a three-panel projector having the three liquid crystal panels but the projector 1 may be a single-panel projector having one liquid crystal panel. Alternatively, the projector may be provided with two or four or more liquid crystal panels.

The first and second exemplary embodiments employ the transmissive liquid crystal panels each having a light-incident side and a light-irradiation side individually. However, a liquid crystal panel having a common light-incident and light-irradiation side may be alternatively used.

In the first and second exemplary embodiments, the liquid crystal panels are used as the optical modulators, but the optical modulator may be another device other than the liquid crystal such as a device having a micro-mirror. In such an arrangement, the polarization plates 452, 453 on the light beam incident side and the light beam emitting side can be omitted.

In the first and second exemplary embodiments, only a front-type projector that projects an image in a direction for observing a screen is exemplified, but an aspect of the invention can be applied to a rear-type projector that projects an image in a direction opposite to the direction for observing the screen.

In the first and second exemplary embodiments, the light source device according to the invention is employed for a projector, but an aspect of the invention is not limited thereto and can be applied to any other optical apparatus and the like.

Although the best mode for implementing an aspect of the invention has been disclosed above, the scope of the invention is not limited thereto. Specifically, although some aspects of the invention have been illustrated and described by taking certain exemplary embodiments as an example, a person skilled in the art can modify the exemplified arrangements in shape, material, quantity and other details without departing from the technical idea and scope of the invention.

Hence, the description containing limitation on shape, material and the like is presented as an example for easy understanding but not intended to limit the invention. Therefore, a description using the names of the components without a part of or all of the limitation on shape, material and the like is also within the scope of the invention.

A light source device according to an aspect of the invention can be utilized as a light source device to be mounted on a projector that is used for presentation, a home theatre system and the like since the light source device is capable of increasing the longevity of a high pressure discharge lamp while suppressing a flicker.

What is claimed is:

1. A light source device, comprising:
   a high pressure discharge lamp in which an electric discharge is generated between a pair of electrodes;
   a lighting device that supplies drive current having a predetermined frequency to the high pressure discharge lamp to light and drive the high pressure discharge lamp; and
   a control device that controllably drives the lighting device, the control device including a power-change controller and a frequency-change controller, the power-change controller controlling drive power supplied from the lighting device to the high pressure discharge lamp to be changeable at least between a first power and a second power lower than the first power, the frequency-change controller controlling a frequency of the drive current supplied from the lighting device to the high pressure discharge lamp to be changeable, in a second power drive mode in which the second power is supplied to the high pressure discharge lamp by the power-change controller, the frequency-change controller changing the frequency of the drive power to a frequency higher than a frequency in a first power drive mode in which the first power is supplied to the high pressure discharge lamp by the power-change controller.

2. The light source device according to claim 1, wherein the frequency in the first power drive mode is preset at a frequency in which a flicker judging value based on a change rate of illuminance measured at a predetermined interval is smaller than a predetermined threshold value when the light source device is driven in the first power drive mode.

3. The light source device according to claim 1, wherein the frequency in the second power drive mode is preset at a frequency in which the flicker judging value based on the change rate of illuminance measured at a predetermined interval is smaller than a predetermined threshold value when the light source device is driven in the second power drive mode.

4. The light source device according to claim 1, wherein the frequency in the first power drive mode is preset at a frequency in which a lamp voltage of the high pressure discharge lamp has a value equal to or larger than a predetermined threshold value for a predetermined time period when the light source device is driven in the first power drive mode.

5. The light source device according to claim 1, wherein the frequency in the second power drive mode is preset at a frequency in which the lamp voltage of the high pressure discharge lamp has a value equal to or larger than a predetermined threshold value for a predetermined time period when the light source device is driven in the second power drive mode.

6. A driving method for driving a high pressure discharge lamp, a power supplied to the high pressure discharge lamp being changeable between two or more levels, the method comprising steps of:
   supplying first power with first frequency to the pressure discharge lamp;
   supplying second power with second frequency to the pressure discharge lamp, wherein the second power is lower than the first power and the second frequency is higher than the first frequency.

7. A projector, comprising:
   a light source device including a high pressure discharge lamp, a lighting device and a control device, in the high pressure discharge lamp an electric discharge being generated between a pair of electrodes, the lighting device supplying drive current having a predetermined frequency to the high pressure discharge lamp to light and drive the high pressure discharge lamp, the control device controllably driving the lighting device, the control device including a power-change controller and a frequency-change controller, the power-change controller controlling drive power supplied from the lighting device to the high pressure discharge lamp to be changeable in two or more levels of power including rated power, the frequency-change controller controlling a frequency of the drive current supplied from the lighting device to the high pressure discharge lamp to be changeable, in a second power drive mode in which the second power is supplied to the high pressure discharge lamp by the power-change controller, the frequency-change controller changing the frequency of the drive power to a frequency higher than a frequency in a first power drive mode in which the first power is supplied to the high pressure discharge lamp by the power-change controller;
   an optical modulator that modulates a light beam irradiated from the light source device in accordance with image information to form an optical image; and
   a projection optical device that projects the optical image formed by the optical modulator in an enlarged manner.

8. The projector according to claim 7, wherein the frequency in the first power drive mode is preset at a frequency in which a flicker judging value based on a change rate of illuminance measured at a predetermined interval is smaller than a predetermined threshold value when the light source device is driven in the first power drive mode.

9. The projector according to claim 7, wherein the frequency in the second power drive mode is preset at a frequency in which the flicker judging value based on the change rate of illuminance measured at a predetermined interval is smaller than a predetermined threshold value when the light source device is driven in the second power drive mode.

10. The projector according to claim 7, wherein the frequency in the first power drive mode is preset at a frequency in which a lamp voltage of the high pressure discharge lamp has a value equal to or larger than a predetermined threshold value for a predetermined time period when the light source device is driven in the first power drive mode.

11. The projector according to claim 7, wherein the frequency in the second power drive mode is preset at a frequency in which the lamp voltage of the high pressure discharge lamp has a value equal to or larger than a predetermined threshold value for a predetermined time period when the light source device is driven in the second power drive mode.

* * * * *